US012577684B2

(12) United States Patent
Erdogan et al.

(10) Patent No.: US 12,577,684 B2
(45) Date of Patent: Mar. 17, 2026

(54) ABSORBING STRUCTURE

(71) Applicant: TUSAS—TURK HAVACILIK VE UZAY SANAYII ANONIM SIRKETI, Ankara (TR)

(72) Inventors: Nursev Erdogan, Ankara (TR); Nail Bugra Kilic, Ankara (TR); Aziz Taner Astarlioglu, Ankara (TR); Busra Rakop, Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 178 days.

(21) Appl. No.: 18/266,855

(22) PCT Filed: Apr. 27, 2021

(86) PCT No.: PCT/TR2021/050393
§ 371 (c)(1),
(2) Date: Jun. 13, 2023

(87) PCT Pub. No.: WO2022/139718
PCT Pub. Date: Jun. 30, 2022

(65) Prior Publication Data
US 2024/0052498 A1 Feb. 15, 2024

(30) Foreign Application Priority Data
Dec. 25, 2020 (TR) ................................. 2020/21780

(51) Int. Cl.
*C04B 35/515* (2006.01)
*B32B 18/00* (2006.01)
(Continued)

(52) U.S. Cl.
CPC .............. *C23C 28/36* (2013.01); *B32B 18/00* (2013.01); *C04B 35/515* (2013.01);
(Continued)

(58) Field of Classification Search
CPC ....... C23C 28/36; C23C 28/34; C04B 35/515; C04B 35/5611
(Continued)

(56) References Cited

U.S. PATENT DOCUMENTS 9,945,036 B2 4/2018 Meschter et al.
10,399,911 B2 9/2019 Shim et al.
(Continued)

FOREIGN PATENT DOCUMENTS

CN 110972477 A 4/2020

OTHER PUBLICATIONS

International Search Report and Written Opinion for PCT application No. PCT/TR2021/050393, mailed Feb. 28, 2022.
(Continued)

*Primary Examiner* — Katherine A Christy
(74) *Attorney, Agent, or Firm* — Notaro, Michalos & Zaccaria P.C.

(57) ABSTRACT

An absorbing structure has a body provided on air vehicles. At least one transition metal alloy is located on the body that consists of two-dimensional inorganic compounds formed by bonding a plurality of carbon atoms and a plurality of nitrogen atoms. A plurality of layers contain the transition metal alloy. At least one barrier coating consists of the layers, which based on a conductivity of the layer, prevents and provides protection against plastic and/or elastic deformations that may occur on the body when an electromagnetic wave acts on the body.

12 Claims, 3 Drawing Sheets

(51) Int. Cl.

| | |
|---|---|
| *C04B 35/56* | (2006.01) |
| *C04B 37/00* | (2006.01) |
| *C23C 28/00* | (2006.01) |

(52) U.S. Cl.
CPC ...... *C04B 35/5611* (2013.01); *C04B 35/5618* (2013.01); *C04B 37/005* (2013.01); *C23C 28/34* (2013.01); *C04B 2237/36* (2013.01); *C04B 2237/58* (2013.01); *C04B 2237/72* (2013.01)

(58) Field of Classification Search
USPC ........................................................ 428/699
See application file for complete search history.

(56) References Cited

U.S. PATENT DOCUMENTS

| | | | |
|---|---|---|---|
| 2012/0106022 A1 | 5/2012 | Aliaga et al. | |
| 2016/0356242 A1 | 12/2016 | Petrus et al. | |
| 2018/0304578 A1* | 10/2018 | Audenaert | C08J 5/042 |
| 2023/0154642 A1* | 5/2023 | Morita | H01B 1/20 |
| | | | 252/500 |

OTHER PUBLICATIONS

International Preliminary Report on Patentability, completed Mar. 13, 2023.
Demand/Request for Preliminary Examination dated Oct. 21, 2022.
International Application Status Report generated May 8, 2023.

\* cited by examiner

ABSORBING STRUCTURE

The present invention relates to an absorbing structure developed to provide protection against lightning and/or electromagnetic wave strikes in air vehicles.

Ensuring safety of air vehicles is of great importance. Lightning protection systems, which is one of the safety measures, are provided with high conductivity materials. Lightning has a high current carrying capacity. When materials such as Al and Ti are used in the body of the air vehicle, the entire vehicle forms a Faraday cage such that the lightning flows from the surface. With the increasing use of composite materials in air vehicles, the air vehicles remain insufficient against lightning strikes due to low electrical and thermal conductivity of composite materials.

In order to provide lightning protection in composite materials, materials such as aluminum, copper, silver are used as a mesh on the surface of the composite structure, laminated inside or used by metallization of the fiber surfaces. These materials are mostly covered on surfaces in the form of an expanded mesh structure. Despite their good performance, metal coatings cause additional weight in air vehicles since they have a high-density ratio. In addition, metal coatings used in composite structures cause corrosion by forming a galvanic couple with the composite. In this case, the structural part may be damaged. In this context, a modular coating design is proposed to be used on the surfaces of composite components, which contains transition metal alloy (MXene).

In the Chinese patent CN110972477, which is included in the known-state of the art, a MXene particulate material and a production method thereof are disclosed. It is stated that $Ti_3AlC_2$ alloy is produced from ceramic powders in the MAX phase, after an acid treatment, in the Mxene material produced in layers.

Thanks to an absorbing structure according to the present invention, lighter barrier coating structures with the same electromagnetic protection in air vehicles can be produced.

Another object of the invention is to achieve a barrier coating which can provide appropriate barrier protection for the body of air vehicles made of different materials.

A further object of the invention is to minimize corrosion compared to conventional production methods for barrier coating layers.

Yet another object of the invention is to allow more flexible and faster production compared to conventional production methods for barrier coating layers.

The absorbing structure realized to achieve the object of the invention and defined in the first claim and the claims dependent thereon comprises a body provided in air or space vehicles. It consists of at least two layers having a transition metal alloy (MXene) containing a plurality of carbon atoms and a plurality of nitrogen atoms located on the body. It comprises a barrier coating which consists of layers on the body and enables the electromagnetic wave to be attenuated in order to protect and/or prevent damages on the body as a result of electromagnetic wave strike or lightning strike.

The absorbing structure of the invention comprises a barrier coating which reacts reversibly due to the difference in the number of carbon and nitrogen atoms in the layers located within the barrier coating. It comprises a barrier coating in which the number of nitrogen atoms contained in a layer decreases in each succeeding layer, and in which the number of carbon atoms contained in a layer increases in each succeeding layer. It comprises a barrier coating which enables heat transfer due to the fact that temperature of the barrier coating increases because of electromagnetic wave strike such that conductivity of the nitrogen atom thereof increases with the temperature, wherein the nitrogen atom functions reversibly when its conductivity decreases due to temperature decrease as a result of lighting strike.

In an embodiment of the invention, the absorbing structure comprises a last layer which is in direct contact with the body since the last layer, which has more carbon atoms than the nitrogen atoms, is the one that is least affected by heat as a result of lightning strike. It comprises a barrier coating generated in as many layers as desired for the protection desired by the user, thanks to the presence of more than one middle layer between the first layer and the last layer. It comprises a barrier coating in which the number of nitrogen atoms gradually increases from the first layer to the last layer, and in which the number of carbon atoms gradually decreases from the first layer to the last layer.

In an embodiment of the invention, the absorbing structure comprises a barrier coating which is obtained by gradually decreasing the nitrogen atoms in the Mxene structure, and provides electromagnetic absorption, as well as flowing/directing the lighting from the surface.

In an embodiment of the invention, the absorbing structure comprises a barrier coating which has equal number of atoms in each layer. Sum of the number of carbon atoms and the number of nitrogen atoms in each layer is equal.

In an embodiment of the invention, the absorbing structure comprises a barrier coating made of composite material, which does not form galvanic corrosion couple with the body of the air vehicle.

In an embodiment of the invention, the absorbing structure is a control surface in the air vehicle such as the body, wing or aileron (leading edge).

In an embodiment of the invention, the absorbing structure comprises a transition metal alloy (MXene), which is a titanium-based alloy.

In an embodiment of the invention, the absorbing structure comprises obtaining a transition metal alloy structure (MXene) by acid treatment of the ceramic-based, Layered Alloy Phase (MAX). It comprises an etching method for reduction of $T_xC_y$ from general formula of $T_{x+1}C_xA$ MXene.

In an embodiment of the invention, the absorbing structure is provided by Chemical Vapor Deposition (CVD) or Physical Vapor Deposition (PVD) or heat treatment methods. It comprises a layer containing nitrogen atoms.

In an embodiment of the invention, the absorbing structure comprises predetermining, by a user, the electrical conductivity value of the layers containing nitrogen atoms by etching with a salt mixture.

In an embodiment of the invention, the absorbing structure comprises a barrier coating which is coated on the body using a spray coating method.

In an embodiment of the invention, the absorbing structure comprises an adhesive, such as a paste, made of a transition metal alloy-based material that is located between the layers and allows the barrier coating to be locally repaired.

In an embodiment of the invention, the absorbing structure comprises a barrier coating which is hydrophilic thanks to layers containing hydrogen atoms and oxygen atoms together with transition metal alloy (MXene) structure.

The absorbing structure realized to achieve the object of the present invention is illustrated in the attached drawings, in which.

Figure 1:
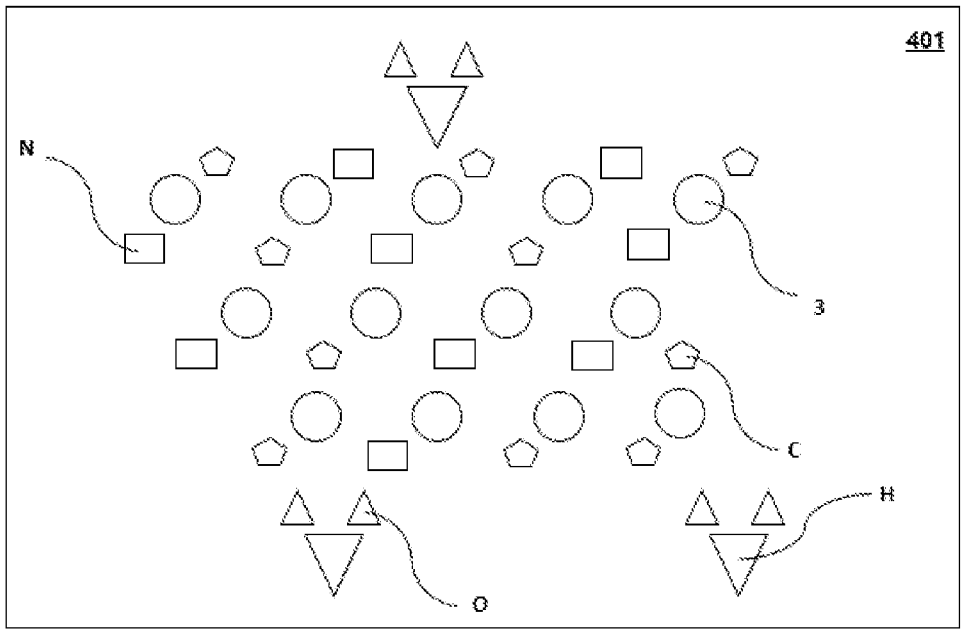
FIG. 1 is a schematic view of the first layer.
Figure 2:
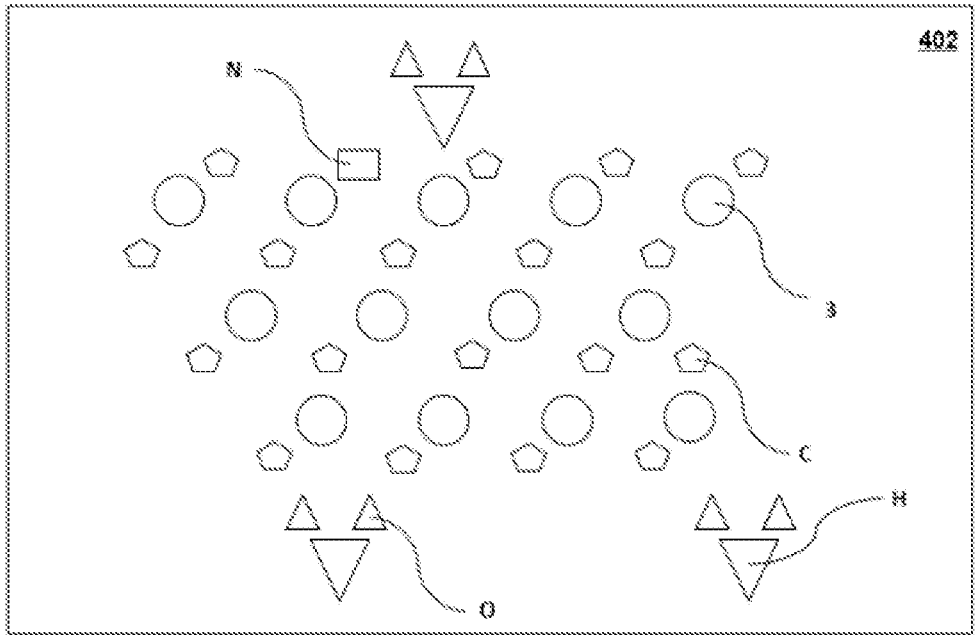
FIG. 2 is a schematic view of the last layer.
Figure 3:
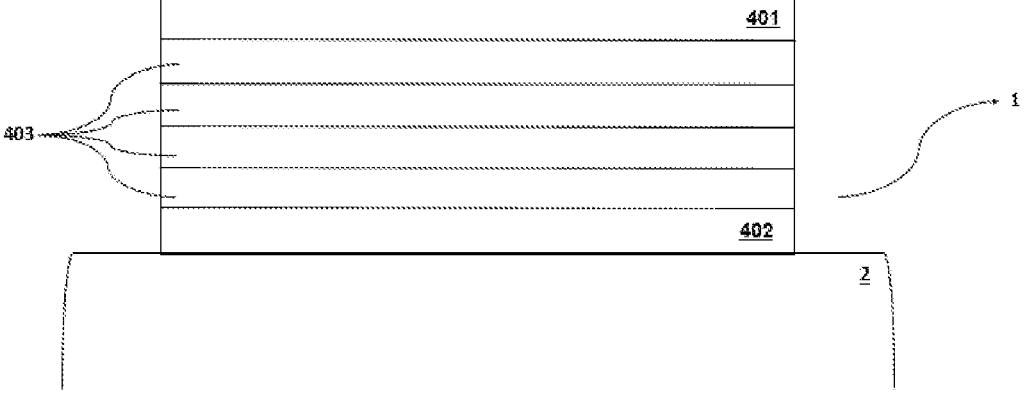
FIG. 3 is a schematic view of the absorbing structure.
Figure 4:
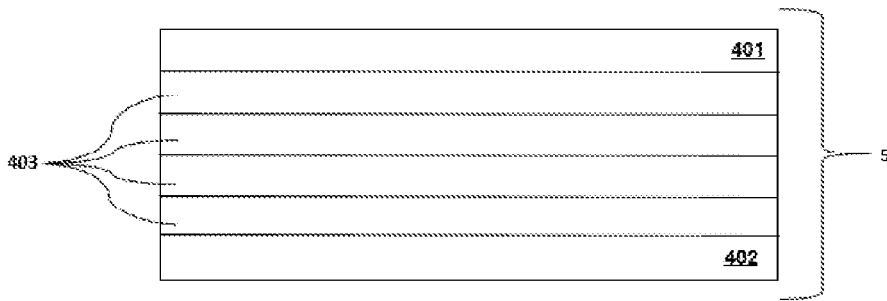
FIG. 4 is a schematic view of the absorbing structure.
Figure 5:
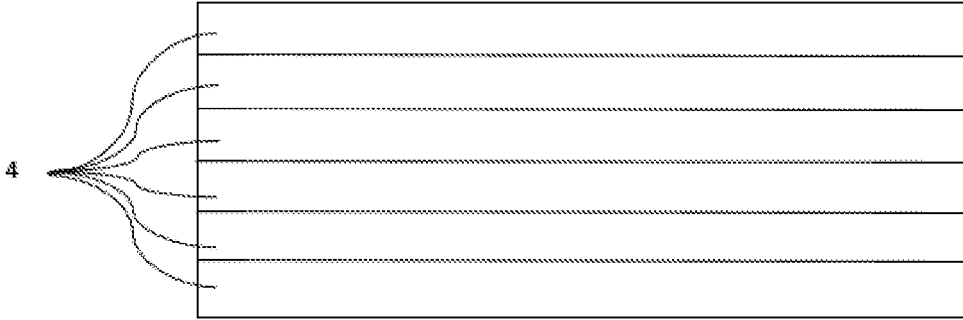
FIG. 5 is a schematic view of the absorbing structure.
Figure 6:
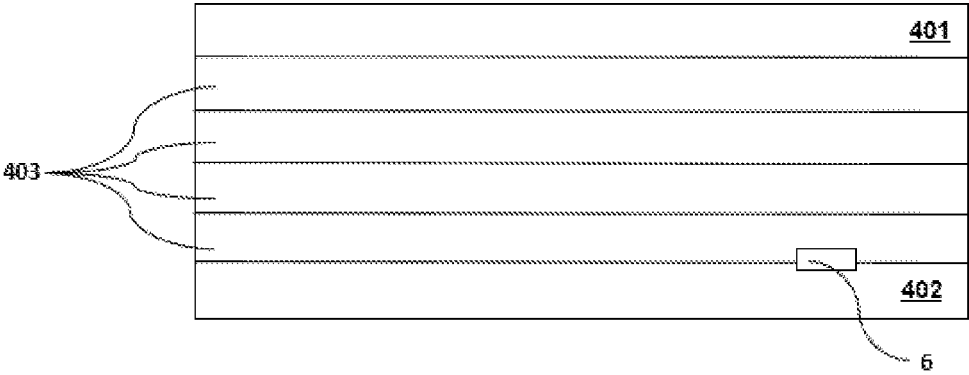
FIG. 6 is a schematic view of the absorbing structure.

All the parts illustrated in figures are individually assigned a reference numeral and the corresponding terms of these numbers are listed below:

1. Absorbing structure
2. Body
3. Transition Metal Alloy
4. Layer
401. First layer
402. Last layer
403. Middle layer
5. Barrier Coating
6. Adhesive
N. Nitrogen Atom
H. Hydrogen Atom
C. Carbon Atom
O. Oxygen Atom The absorbing structure (1) comprises a body (2) provided on air vehicles; at least one transition metal alloy (3) which is located on the body (2) and consists of two-dimensional inorganic compounds by bonding a plurality of carbon atoms (C) and a plurality of nitrogen atoms (N); a plurality of layers (4) containing the transition metal alloy (3); at least one barrier coating (5) consisting of layers (4), which, thanks to the conductivity of the layer (4), prevents and provides protection against plastic and/or elastic deformations that may occur on the body (2) as a result electromagnetic wave that will act on the body (2).

The absorbing structure (1) of the invention comprises a first layer (401) which is located on the body (2) and has a transition metal alloy (3) which contains more nitrogen atoms (N) than carbon atoms (C); and a last layer (402) which is located on the body (2) such that it is closer to the body (2) than the first layer (401), and has a transition metal alloy (3) which contains more carbon atoms (C) than nitrogen atoms (N).

A body (2) in air or space vehicles consists of a plurality of layers (4) having a transition metal alloy (3) (MXene) formed by the addition of carbon atom (C) and nitrogen atom (N) on the body (2). It comprises a barrier coating (5) consisting of layers (4) on the body (2) and attenuating or preventing the electromagnetic wave in order to provide protection against and/or eliminate the damages that may occur on the body (2) by electromagnetic wave strike.

It comprises a barrier coating (5) which reacts reversibly due to the difference in the number of carbon atoms (C) and nitrogen atoms (N) in the layers (4). It comprises a first layer (401) containing more nitrogen atoms (N) than the carbon atoms (C) in the layers (4) extending outwardly from the body (2). It comprises a last layer (402) containing less nitrogen atoms (N) than the carbon atoms (C) in the layers (4) extending outwardly from the body (2). It comprises a last layer (402) which contacts the body (2) in an integrated manner since the last layer (402), which has more carbon atoms (C) than the nitrogen atoms (N) compared to the first layer (401), is the one that is less affected by heat than the first layer (401) as a result of electromagnetic wave or lightning strike. It comprises a barrier coating (5) which enables heat transfer due to the fact that temperature of the barrier coating (5) increases because of lightning strike such that conductivity of the nitrogen atom (N) thereof increases with the temperature, wherein the nitrogen atom (N) functions reversibly when its conductivity decreases due to temperature decrease as a result of lighting strike. Since the number of atoms differs in each layer (4), a mesh/porous structure is formed in the cage system. Therefore, the flow of electromagnetic wave from the surface is accelerated. The barrier coating (5), whose temperature increases with the electromagnetic wave strike, provides heat transfer through the nitrogen atom (N) whose conductivity increases with temperature. It comprises a barrier coating (5) which comprises reverse functioning of the nitrogen atom (N) whose conductivity decreases when the temperature decreases as a result of electromagnetic wave strike.

In an embodiment of the invention, the absorbing structure (1) comprises a plurality of middle layers (403) located between the first layer (401) and the last layer (402); and a barrier coating (5) in which density of nitrogen atoms (N) gradually decreases from each layer (4) to the next layer (4) from the first layer (401) towards the last layer (402), and in which density of carbon atoms (C) gradually increases from each layer (4) to the next layer (4). Impedance matching is achieved by gradually decreasing the nitrogen atom (N) density from each layer (4) towards the next layer (4) and gradually increasing the carbon atom (C) from each layer (4) towards the next layer (4).

In an embodiment of the invention, the absorbing structure (1) comprises a barrier coating (5) which absorbs and directs the electromagnetic wave due to the nitrogen atom (N) which decreases gradually between the layers (4). Thanks to the barrier coating (5) obtained by gradually decreasing the nitrogen atoms (N) in the transition metal alloy (3) structure, electromagnetic wave absorption is provided, as well as flowing/directing the lighting from the surface.

In an embodiment of the invention, the absorbing structure (1) comprises a barrier coating (5) which has equal number of atoms in each layer (4). Since the total number of nitrogen atoms (N) and carbon atoms (C) in each layer (4) are equal, the void ratio in each layer (4) is equal. Therefore, heat dissipation is fast. Since the total number of carbon atoms (C) and nitrogen atoms (N) is equal in each layer (4), the dimensions of the layer (4) are the same. The sum of the number of carbon atoms (C) and the number of nitrogen atoms (N) in each layer (4) is equal. Thus, a lighter barrier coating (5) is provided with a high void ratio.

In an embodiment of the invention, the absorbing structure (1) comprises a barrier coating (5) which is located on the body (2) made of thermoset or thermoplastic reinforced composite material, and enables that there is no galvanic corrosion couple with the body (2). The corrosion resistance is high since there is no galvanic corrosion couple between the body (2), which is made of thermoset reinforced composite material and located on the air vehicle, and the barrier coating (5) which is integrated with the body (2).

In an embodiment of the invention, the absorbing structure (1) comprises a body (2) which is a control surface such as a wing or aileron on the air vehicle. The body (2) on the air vehicle forms control surfaces such as wings and ailerons. Barrier coating (5) is applied intensely to these areas.

In an embodiment of the invention, the absorbing structure (1) comprises a transition metal alloy (3), which is a titanium-based alloy. The transition metal alloy (3), which is a titanium-based alloy, is compatible with the body (2) on the air vehicle and provides conductivity and corrosion resistance for the air vehicle. While it is compatible with the air vehicle body (2), it also provides conductivity and corrosion resistance for the air vehicles. The conductivity is adjusted by using Titanium-containing Mxene and changing the atomic layers by inclusion and intercalation of the atomic layers.

In an embodiment of the invention, the absorbing structure (1) comprises a layer (4) consisting of a transition metal alloy (3) that is obtained by etching the ceramic-based, layered alloy phase. It comprises an etching method for reduction of $T_xC_y$ from general formula of $T_{x+1}C_xA$ MXene. With the treatment of the layered alloy phase (MAX), the transition metal alloy (3) structure (MXene) is obtained.

In an embodiment of the invention, the absorbing structure (1) comprises a layer (4) obtained by impregnating nitrogen atoms (N) by chemical vapor deposition (CVD) or physical vapor deposition (PVD) method. Nitrogen atoms (N) are impregnated into the transition metal alloy (3) (MXene) obtained as a result of the etching process, and the structure is enabled to contain nitrogen atom (N).

In an embodiment of the invention, the absorbing structure (1) comprises a barrier coating (5) in which electrical conductivity value of the layers (4) containing nitrogen atom (N) can be adjusted by the user due to the etching process performed with a salt mixture containing fluorine atoms. By etching with the salt mixture, it is enabled that the electrical conductivity value of each layer (4) containing nitrogen atom (N) is adjusted according to a desired value.

In an embodiment of the invention, the absorbing structure (1) comprises a barrier coating (5) applied on the body (2) by a spray coating method. By using the spray coating method, the surface of the body (2) is provided with a barrier coating (5) which can be coated homogeneously and/or locally. Thanks to the spray coating, its density can be increased locally, and a thin barrier coating (5) can be provided.

In an embodiment of the invention, the absorbing structure (1) comprises at least one adhesive (6), such as a paste, made of the transition metal alloy (3) based material itself, located between two layers (4) and allowing the barrier coating (5) to be repaired locally. Thanks to the adhesive (6), local repairs can be made on the barrier coating (5).

In an embodiment of the invention, the absorbing structure (1) comprises a barrier coating (5) which is hydrophilic thanks to the layers (4) having hydrogen atom (H) and oxygen atom (O) together with the transition metal alloy (3). Thanks to the hydrophilic surface of the barrier coating (5), the barrier coating (5) is able to be adhered to the body (2). It comprises hydrogen atom (H) and oxygen atom (O) or hydroxide structure (OH—) as surface finishing element. Thanks to the hydrophilic barrier coating (5), the adhesion of the layers (4) to each other and to the body (2) becomes easier.

The invention claimed is:

1. An absorbing structure (1) comprising:
a body (2) provided on an air vehicle;
at least one barrier coating (5) having a conductivity that prevents and provides protection against plastic and/or elastic deformations that occur on the body (2) as a result of an electromagnetic wave acting on the body (2), the at least one barrier coating comprising:
a first layer (401) which is located on the body (2) and has a first transition metal compound containing two-dimensional inorganic compounds including a plurality of carbon atoms (C) and a plurality of nitrogen atoms (N), with more nitrogen atoms (N) than carbon atoms (C);
a last layer (402) which is located on the body (2) such that it is closer to the body (2) than the first layer (401) and has a second transition metal compound containing two-dimensional inorganic compounds including a plurality of carbon atoms (C) and a plurality of nitrogen atoms (N), with more carbon atoms (C) than nitrogen atoms (N); and
a plurality of middle layers (403) located between the first layer (401) and the last layer (402), each of the plurality of middle layers having an associated transition metal compound containing two-dimensional inorganic compounds including a plurality of carbon atoms (C) and a plurality of nitrogen atoms (N); and
wherein the barrier coating (5) has a density of nitrogen atoms (N) that decreases from the first layer (401) to each subsequent one of the middle layers (403) and then to the last layer (402), and in which a density of carbon atoms (C) increases from the first layer (401) to each subsequent one of the middle layers (403) and then to the last layer (402).

2. The absorbing structure (1) according to claim 1, wherein the barrier coating (5) absorbs and directs the electromagnetic wave due to the nitrogen atoms (N) which decreases between the layers (4).

3. The absorbing structure (1) according to claim 1, wherein the barrier coating (5) has an equal number of atoms in each of the first layer (401), the last layer (402), and the plurality of middle layers (403).

4. The absorbing structure (1) according to claim 1, wherein the body (2) is made of composite material.

5. The absorbing structure (1) according to claim 1, wherein the body (2) is a control surface of a wing or aileron on the air vehicle.

6. The absorbing structure (1) according to claim 1, wherein each transition metal alloy (3) is a titanium-based alloy.

7. The absorbing structure (1) according to claim 1, wherein at least one of the transition metal alloys (3) is obtained by etching a ceramic-based, layered alloy phase.

8. The absorbing structure (1) according to claim 1, wherein at least one of the first layer (401), the last layer (402), and the plurality of middle layers (403) is obtained by impregnating nitrogen atoms (N) by chemical vapor deposition (CVD) or physical vapor deposition (PVD) method.

9. The absorbing structure (1) according to claim 1, wherein an electrical conductivity value of one or more of the first layer (401), the last layer (402), and the plurality of middle layers (403) which contain nitrogen atom (N) can be adjusted due to an etching process performed with a salt mixture.

10. The absorbing structure (1) according to claim 1, wherein the barrier coating (5) is applied on the body (2) by a spray coating method.

11. The absorbing structure (1) according to claim 1, comprising at least one adhesive (6) made of a transition metal alloy (3)-based material itself that is located between two layers among the first layer (401), the last layer (402), and the plurality of middle layers (403) and allows the barrier coating (5) to be repaired locally.

12. The absorbing structure (1) according to claim 1, wherein the barrier coating (5) is hydrophilic based on each of the first layer (401), the last layer (402), and the plurality of middle layers (403) having a hydrogen atom (H) and an oxygen atom (O) together with the transition metal alloy (3).

* * * * *